(12) United States Patent
Hooker

(10) Patent No.: US 6,343,423 B1
(45) Date of Patent: Feb. 5, 2002

(54) INDICATOR MEANS FOR DETERMINING MITER AND BEVEL ANGLES FOR SAWING CONTAINER PANELS

(76) Inventor: Laurence L. Hooker, 1446 Wilshire Dr., Stayton, OR (US) 97383

( * ) Notice: Subject to any disclaimer, the term of this patent is extended or adjusted under 35 U.S.C. 154(b) by 0 days.

(21) Appl. No.: 09/561,135

(22) Filed: Apr. 28, 2000

(51) Int. Cl.$^7$ .................................................. G01B 3/56
(52) U.S. Cl. .......................... 33/534; 33/1 SB; 33/430; 33/474; 33/628
(58) Field of Search .......................... 33/1 F, 1 G, 1 N, 33/1 AP, 1 SB, 430, 474, 475, 476, 485, 534, 628, 613, 645

(56) References Cited

U.S. PATENT DOCUMENTS

| | | | | |
|---|---|---|---|---|
| 2,532,329 A | * | 12/1950 | Premo | 33/474 |
| 2,619,775 A | * | 12/1952 | Judd, Jr. | 33/430 |
| 3,610,519 A | * | 10/1971 | Radosavljevic et al. | 33/430 |
| 4,095,346 A | * | 6/1978 | Cox | 33/476 |
| 4,404,753 A | * | 9/1983 | Klok | 33/476 |
| 4,742,619 A | * | 5/1988 | Swanson | 33/474 |
| 5,832,913 A | * | 11/1998 | Arends | 33/474 |

* cited by examiner

Primary Examiner—G. Bradley Bennett
(74) Attorney, Agent, or Firm—James D. Givnan, Jr.

(57) ABSTRACT

A base is provided with right angularly disposed scales marked in degrees starting from zero degrees at an intersection of the scales. Indicators are elongate and pointed at their ends and each of different length. Placement of an indicator on the base in a diagonal manner with its ends on separate scales will indicate miter and bevel angles for a compound miter cut of each container panel. Each indicator bears a number to indicate the number of panels in a container having its panels cut using the compound angles identified by the indicator.

2 Claims, 2 Drawing Sheets

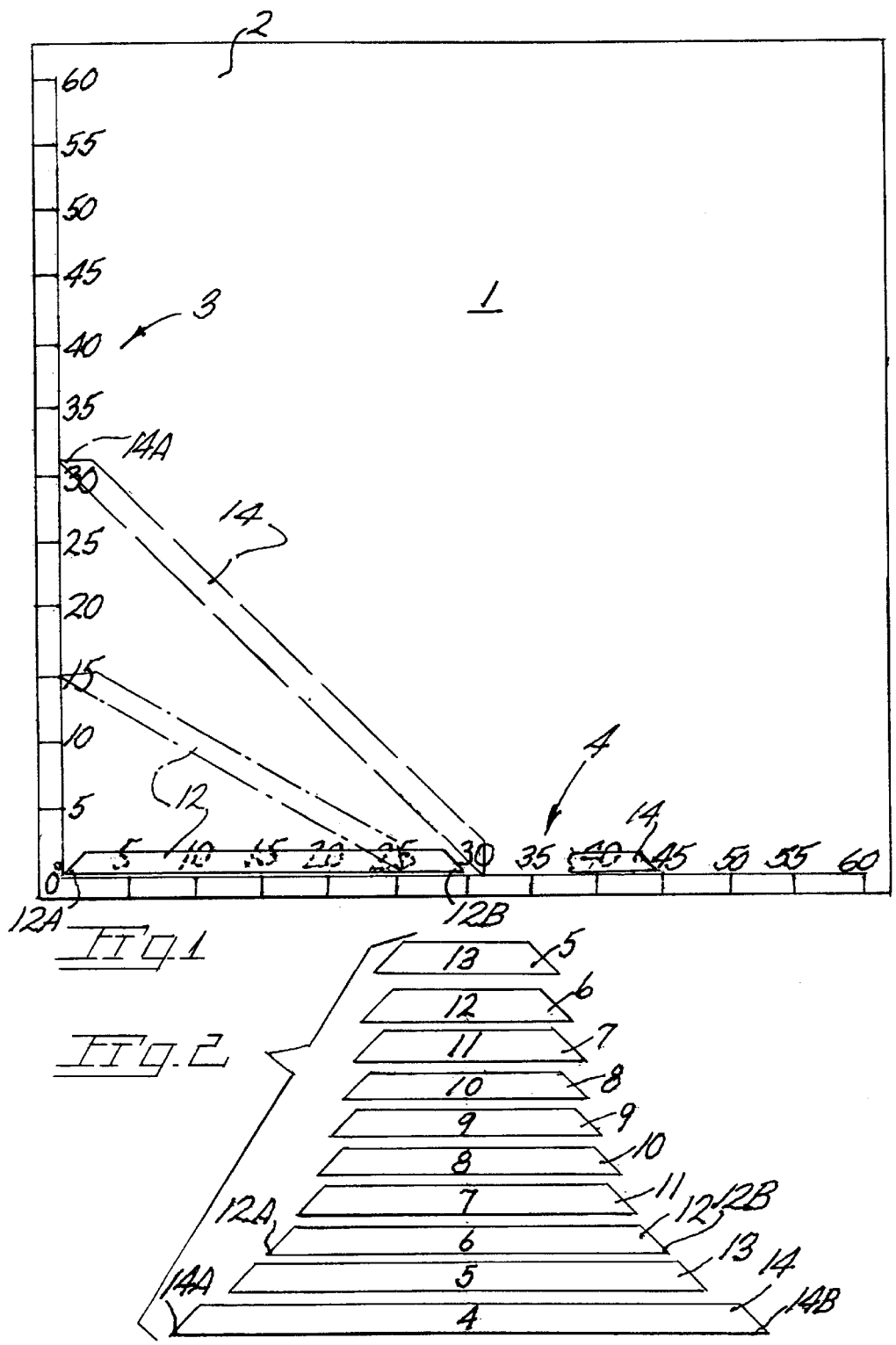

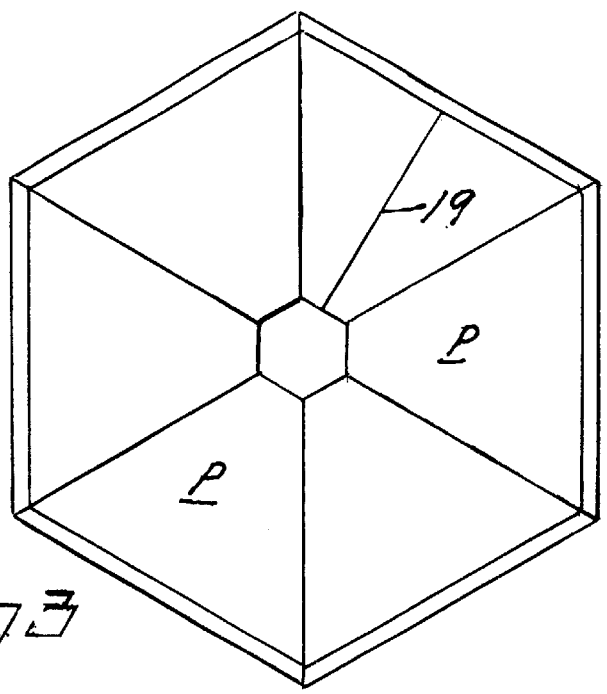
_Fig.3_
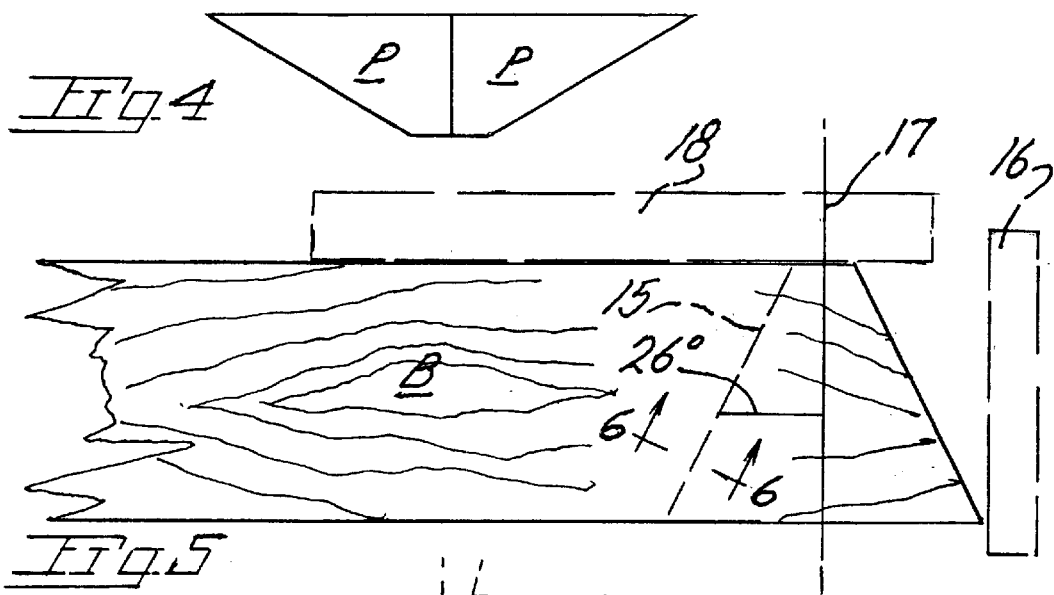
_Fig.4_
_Fig.5_
_Fig.6_

INDICATOR MEANS FOR DETERMINING MITER AND BEVEL ANGLES FOR SAWING CONTAINER PANELS

BACKGROUND OF THE INVENTION

The present invention concerns generally the construction of multisided containers having panels cut from a board and assembled in edge-to-edge abutment.

In the construction of containers such as planters, decorative bowls, etc., it is highly desirable to determine both the miter and bevel angles to ensure surface abutting of each panel with adjacent panel edges. The matter of setting a power saw to cut compound miters to achieve desired such abutment of the panel components is sometimes accomplished in a time consuming trial and error manner. Considerable effort may be expended in the calculation of power saw settings to make the necessary compound miter cuts as well as determining the inclination of container panels.

SUMMARY OF THE PRESENT INVENTION

The present invention is embodied within indicating means for determining the angles of a compound miter cut container panels to be assembled into a container.

The present indicator means includes a base having mutually perpendicular scales displayed thereon with at least some of the scale indices marked in degrees. The scales are marked in uniform spaced increments with an intersection of the scales being zero degrees. An array of indicators of different lengths each bear a specific number to indicate use of that indicator will result in a container having that number of side panels, e.g., an indicator marked with a six will result in providing the angles necessary for construction of a six-sided container. Placement of a selected indicator in an inclined manner on the base will simulate the inclination of each panel of a finished container.

Important objectives of the present invention include the provision of indicator means precluding the computation of saw settings for cutting compound miters; the provision of indicator means for determining the compound miter settings of a saw using only the selection of an indicator and placement of same on a base having perpendicularly orientated scales to indicate both the miter angle and the bevel angle for a compound miter cut; the provision of indicator means particularly suited toward readily providing the bevel and miter angles for the setting of a radial arm saw to make a compound miter cut; the provision of indicator means of simple low cut construction requiring no mechanical additions or alterations to the power saw used for cutting container panels.

BRIEF DESCRIPTION OF THE DRAWINGS

In the drawings:

FIG. 1 is a plan view of a base of the present indicator means marked with intersecting scales;

FIG. 2 is a plan view of an array of pointers or indicators for use with the intersecting scales of FIG. 1;

FIG. 3 is a plan view of a container comprised of identical panels;

FIG. 4 is a front elevational view of FIG. 3;

FIG. 5 is a schematic plan view of a board in abutment with a power saw fence and a stop for subsequent cutting;

FIG. 6 is a vertical sectional view taken along line 6—6 of FIG. 5 showing the inclination desired for a compound miter cut.

DETAILED DESCRIPTION OF THE PREFERRED EMBODIMENTS

With continuing attention to the drawings, wherein applied reference numerals indicate parts similarly hereinafter identified, the reference numeral 1 indicates a base of the present indicator means having a planar surface 2, marked with scales generally at 3 and 4 which extend in right angular or perpendicular fashion from an intersection indicated at zero degrees.

An array of indicators shown in FIG. 2 are cut to the desired length with each indicator bearing a numeral signifying the number of panels in the container being constructed using the last mentioned indicator in the later described manner. The length of each indicator is determined by dividing the number of panels desired in a container under construction into 180. Accordingly, each indicator or pointer at 5–14 would be sized to extend from the zero degree intersection on base 1 to a degree mark on horizontal scale 4. For example, were it desired to build a container having ten sides, the indicator or pointer length would be determined by dividing 180 by 10, resulting in the indicator being made to extend from the zero degree point to indices at 18 on horizontal scale 4. In practice, a set of indicators or pointers would be made, as shown in FIG. 2., to cover a range of multisided containers.

Upon such determining the length of the pointer or indicator as above described, an indicator selected, for example, indicator 12 is manually positioned on base 1 to simulate the pitch or inclination of the container panel P. Panel inclination will, of course, be determined selectively by the individual user. Upon such inclined placement indicator end 12A will be on a degree increment of scale 3 and end 12B on a degree increment of scale 4. Scale 3 may be termed the saw blade angle scale while scale 4 may be termed the saw arm angle scale for a radial saw arm. Indicator end 12A will now indicate the blade angle to which the blade will be adjusted assuming we are utilizing a radial arm saw or other saw where a compound miter cut may be made. Pointer end 12B, now on scale 4, will indicate the saw arm angle of approximately twenty six degrees to which the radial saw arm must be adjusted and locked for the subsequent compound meter cut at 14 in FIG. 5 and FIG. 6.

A second example, using indicator 14, would result in a bevel or blade angle and an arm angle both of approximately thirty two degrees as indicated by the pointer ends 14A and 14B. This example assumes the desired pitch of the container panels is 45 degrees.

While the above describes the invention and use thereof with a reference to a container having like panels, the present invention may be utilized to make containers having panel components of other than one configuration, for example, a planter box having two long sides and two ends of lesser length. Such would be achieved by repositioning the saw table mounted stop 16 toward and away from the zero degree position at 17 of the saw radial arm during cutting the four panels. A fence 18 on the saw table is also conventionally adjustable. The length of a container panel at 19 in FIG. 1 would be determined by selection of the board at B of the width desired from which the panels are sawn. Once the fence and stop are positioned for cutting identical panels the board B is simply inverted and then advanced lengthwise after each cut to bring its cut end into contact with the stop 16 as shown in FIG. 5.

While I have shown but one embodiment of the invention, it will be apparent to those skilled in the art that the invention may be embodied still otherwise without departing from the spirit and scope of the claimed invention.

I claim:

1. Indicator means for determining the bevel angle and the miter angle for making compound cuts from a board for sawing panels for the assembly into a multisided container, said indicator means comprising, a base having mutually perpendicular intersecting scales graduated in uniform increments marked in degrees, an array of indicators each elongate and of different lengths and each having first and second ends, and each of said indicators selectively placed on the base in a diagonal manner having said first and second ends respectively on said scales and when inclined to simulate the inclination of the container panels will indicate the bevel angle and the miter angle for the compound cut.

2. The method of determining the bevel angle and the miter angle of a compound cut for cutting the edges of panels to be assembled in edgewise abutment to form a multisided container, including the steps of, marking a base to provide right angularly intersecting scales each having increments marked with degrees starting with zero, dividing 180 by the number of panels desired in the multisided container to be assembled, sizing a double ended indicator to a length so as to enable locating one end of the pointer at the intersection of the scales and the remaining end of the indicator at the degree resultant from the preceding step, positioning the indicator diagonally with the indicator ends individually on one of said scales and inclined to the desired pitch of the container panels, reading the degree increments on each scale indicated by the indicator ends.

* * * * *